US005437794A

United States Patent [19]

Andersson

[11] Patent Number: 5,437,794

[45] Date of Patent: Aug. 1, 1995

[54] HYDROCYCLONE WITH TURBULENCE CREATING MEANS

[75] Inventor: Roine Andersson, Järfälla, Sweden

[73] Assignee: Celleco Hedmora AB, Stockholm, Sweden

[21] Appl. No.: 244,699

[22] PCT Filed: Nov. 26, 1992

[86] PCT No.: PCT/SE92/00814

§ 371 Date: Jun. 1, 1994

§ 102(e) Date: Jun. 1, 1994

[87] PCT Pub. No.: WO93/10908

PCT Pub. Date: Jun. 10, 1993

[30] Foreign Application Priority Data

Dec. 2, 1991 [SE] Sweden .............................. 9103569

[51] Int. Cl.[6] .............................................. B01D 21/20

[52] U.S. Cl. ................................ 210/512.1; 210/787; 209/719; 209/720; 209/733; 55/459.1

[58] Field of Search ............................ 210/512.1, 787; 209/719, 720, 733; 55/459.1

[56] References Cited

U.S. PATENT DOCUMENTS 4,153,558 5/1979 Frykhult .......................... 210/512.1
4,156,485 5/1979 Skardal ............................ 210/512.1

FOREIGN PATENT DOCUMENTS

039767A3 9/1982 European Pat. Off. .
3244336A1 6/1983 Germany .
2809575C2 3/1987 Germany .

OTHER PUBLICATIONS

Derwent's abstract, No. 49554 E/24, week 8224, Abstract SU, 856560 (Oreless Cons Mat) 25 Oct. 1978.

*Primary Examiner*—Robert A. Dawson
*Assistant Examiner*—David Reif Snyder
*Attorney, Agent, or Firm*—Davis Hoxie Faithfull & Hapgood

[57] ABSTRACT

In a hydrocyclone the separation chamber (2) has a circumferential wall (3) provided with at least one turbulence creating member (12), which extends along the circumferential wall and crosses a helical path (10) along which a liquid stream is generated during operation. According to the invention, the turbulence creating member is formed by an offset (12) on the circumferential wall (3). The offset is formed and dimensioned such that said liquid stream substantially loses its contact with the circumferential wall as the liquid stream passes the offset. As a result turbulence is created in a layer of the liquid stream situated closest to the circumferential wall, without the liquid stream developing any substantial flow component directed inward in the separation chamber.

8 Claims, 2 Drawing Sheets

HYDROCYCLONE WITH TURBULENCE CREATING MEANS

Figure 1:
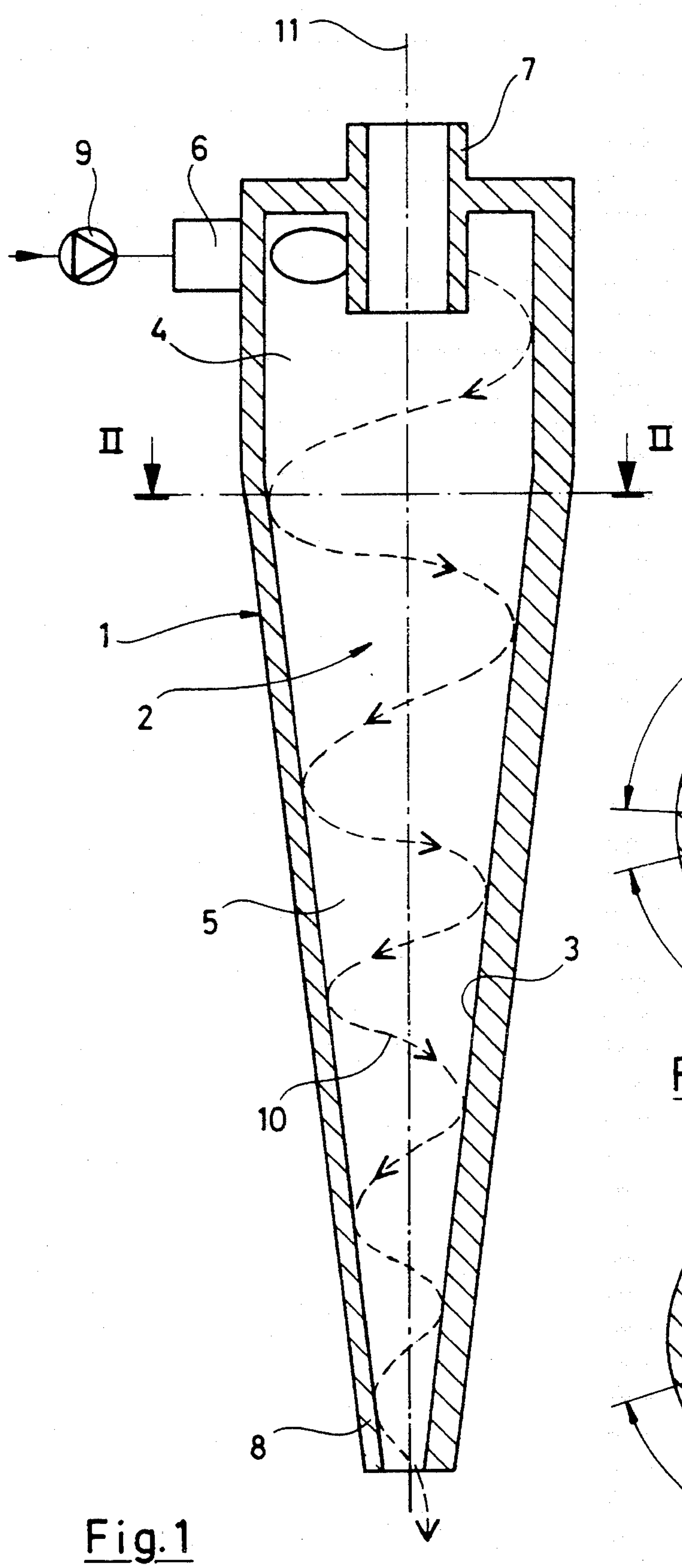

The present invention relates to a hydrocyclone for separating a liquid mixture into a heavy fraction and a light fraction, comprising a housing forming an elongated separation chamber with a circumferential wall and two opposed ends, an inlet member for supplying the liquid mixture tangentially into the separation chamber at one end of the latter, an outlet member for discharging separated heavy fraction from the separation chamber at the other end of the latter, and an outlet member for discharging separated light fraction from the separation chamber. The hydrocyclone further comprises means for supplying the liquid mixture to the separation chamber via the inlet member, so that during operation a liquid stream is generated along a helical path having a central axis in the separation chamber, said helical path extending from the inlet member to said outlet member for heavy fraction, and at least one turbulence creating member extending in the separation chamber along the circumferential wall and crossing said path.

In a known hydrocyclone of this kind according to U.S. Pat. No. 4,153,558 there are four turbulence creating members in the form of axial ridges on the circumferential wall. When such a ridge is passed by a liquid stream turbulence is created in a layer of the liquid stream located closest to the circumferential wall, which prevents growth of deposits on the circumferential wall. Unless growth of the deposits is prevented during operation, the deposits might finally clog the outlet member for heavy fraction.

However, the liquid stream will become an inwardly directed component of movement into the separation chamber when the liquid stream passes each ridge, which means that separated light fraction will contain a large amount of heavy components which were supposed to be discharged with separated heavy fraction. This is particularly a drawback when separating liquid mixtures constituted by fibre suspensions, which will be explained more closely in the following.

In the pulp and paper industry hydrocyclones are frequently used for cleaning fibre suspensions from undesired heavy particles. Thus, the fibre suspensions are separated into heavy fractions containing said undesired heavy particles and light fractions containing fibres. A typical hydrocyclone plant for this purpose has hydrocyclones arranged in several stages of hydrocyclones coupled in parallel (normally three or four stages), the hydrocyclone stages being coupled in series with each other. Separated heavy fraction from the first hydrocyclone stage is once more separated in the second hydrocyclone stage, since said heavy fraction also contains fibres, whereafter separated heavy fraction from the second hydrocyclone stage is separated in the third hydrocyclone stage, and so on. In this manner fibres are recovered step by step from created heavy fraction. Light fraction, containing recovered fibres formed in a hydrocyclone stage, is supplied back to the preceding hydrocyclone stage. In this connection it is important that the hydrocyclones, at least in the first hydrocyclone stage, separate efficiently, so that the light fraction contains as few heavy undesired particles as possible.

A problem in connection with separating a fibre suspension by means of a hydrocyclone is that tight mats of fibres can be developed on the circumferential wall of the separation chamber. Heavy undesired particles are easily caught in such mats of fibres, which can result in clogging of the outlet member for heavy fraction. This problem is eliminated by the prior art kind of hydrocyclone described above, whereby the creation of tight mats of fibres on the circumferential wall of the separation chamber is counteracted by said ridges. However, a drawback to the prior art hydrocyclone is that during operation each ridge gives the flowing fibre suspension an inwardly directed component of movement in the separation chamber, whereby an increased share of the undesired heavy particles follows separated light fraction containing fibres.

The object of the present invention is to provide a new improved hydrocyclone of the prior art kind, which is capable of separating a liquid mixture such that created light fraction will be substantially free from heavy components.

This object is obtained by means of a hydrocyclone of the kind described initially, which mainly is characterized in that immediately upstream the turbulence creating member in the separation chamber the circumferential wall has a smooth surface along a first zone of the circumferential wall, which is situated at a substantially constant distance from said centre axis along at least a one fifth of the circumference of the separation chamber; that the turbulence creating member is formed by an offset on the circumferential wall, which offset extends from said first zone of the circumferential wall to a second zone of the circumferential wall situated at a greater distance from the centre axis than the first zone, the second zone extending forwards from the offset, as seen in the flow direction of said liquid stream; and that the offset is formed and dimensioned such that during operation said liquid stream substantially looses its contact with the circumferential wall, as the liquid stream passes the set-off. Hereby, turbulence is created in a layer of the liquid stream situated closest to the circumferential wall, without the liquid stream developing any substantial flow component directed against said centre axis.

The term "offset" is used here to mean a ledge formed on the face of a wall by diminution of the wall thickness above.

When separating fibre suspensions by means of the new hydrocyclone a light fibre fraction thus is created containing substantially fewer undesired heavy particles as compared to the light fraction created at a corresponding separation by means of the above mentioned prior art hydrocyclone. In addition, it has surprisingly been proved that the heavy fraction created by means of the new hydrocyclone contains substantially fewer fibres than the heavy fraction created by means of the prior art hydrocyclone. This surprising effect probably depends on that the under pressure generated closest to the circumferential wall of the separation chamber, when the liquid stream passes the offset, causes the flocks of fibres close to the circumferantial wall to expand, so that the fibres in said fibre flocks are released from each other. The released fibres having a relatively large specific surface separate easier in direction inwards in the separation chamber than said fibre flocks having a relatively small specific surface.

Thus, the new hydrocyclone is capable of separating fibre suspensions, such that the created heavy fraction will be relatively thin. For the pulp and the paper industry the use of the new hydrocyclone means the advantage that fewer hydrocyclones than previously are needed for cleaning fibre suspensions from undesired heavy particles, since created heavy fraction from a hydrocyclone stage need not be diluted so much before it is supplied to the next hydrocyclone stage.

Practical tests have proved that said first zone of the circumferential wall of the separation chamber should be at least one fifth of the circumference of the separation chamber, which means that at most four offset can be arranged equally divided around the circumference of the separation chamber. However, an optimum turbulence creating effect is already achieved with one or at most two offsets.

Said second zone extends suitably along at least a fifth part of the circumference of the separation chamber, the distance between the second zone and the centre axis decreasing along the circumference of the separation chamber in direction away from the offset, as seen in the flow direction of said liquid stream. At the end of the second zone, the second zone has suitably substantially the same distance to the centre axis as the first zone.

Preferably, the circumferential wall has a sharp edge where the first zone borders to the offset, in order to facilitate that said liquid stream will loose its contact with the circumferential wall, as it passes the offset.

According to a preferred embodiment of the new hydrocyclone the separation chamber in a way known per se (see U.S. Pat. No. 4,156,485) is formed by a plurality, axially consecutively arranged cylindrical chamber portions, which are formed such that the cross-sectional area of the separation chamber decreases step by step towards the outlet member for heavy fraction, the chamber portions coinciding to form a straight line extending in parallel with the chamber portions. The advantage of a separation chamber formed in this manner as compared to an ordinary conical separation chamber is that the circumferential walls of the cylindrical chamber portions will not give rise to forces on separated heavy particles directed against the axial flow direction of the liquid mixture. Therefore, separated heavy particles are prevented from rotating along the circumferential wall of the separation chamber without an axial movement relative to the separation chamber and from causing local wear of the circumferential wall. Instead, heavy particles are entrained by the liquid mixture to shelves extending between the chamber portions in the circumferential direction of the separation chamber. Via breaks formed in said shelves the heavy particles are entrained by the liquid mixture axially further in the separation chamber towards the outlet member for heavy fraction.

Preferably, said offset is situated in front of said straight line touching the cylindrical chamber portions. The chamber portions are suitably formed such that the one of two adjacent chamber portions which is located next to the outlet member for heavy fraction has a transverse extension from said straight line to the offset which amounts to the corresponding transverse extension of the other chamber portion reduced by at most the transverse extension of the offset. As a result the separation chamber can be formed such that the shelves are provided with an additional break at the offset, which has the advantage that separated heavy particles are entrained by the liquid stream axially in the separation chamber also at the area of each offset.

Figure 2:
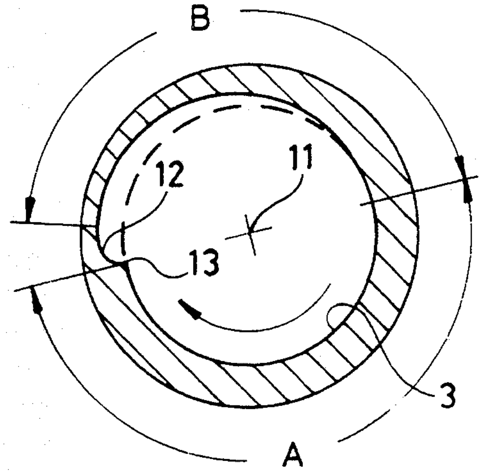
Figure 3:
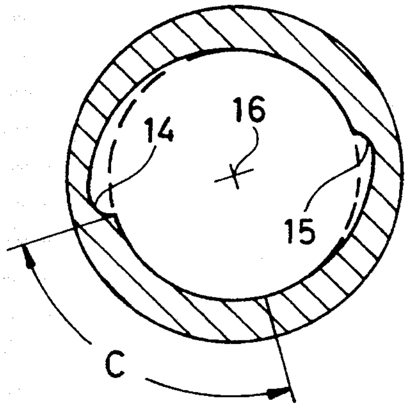
Figure 4:
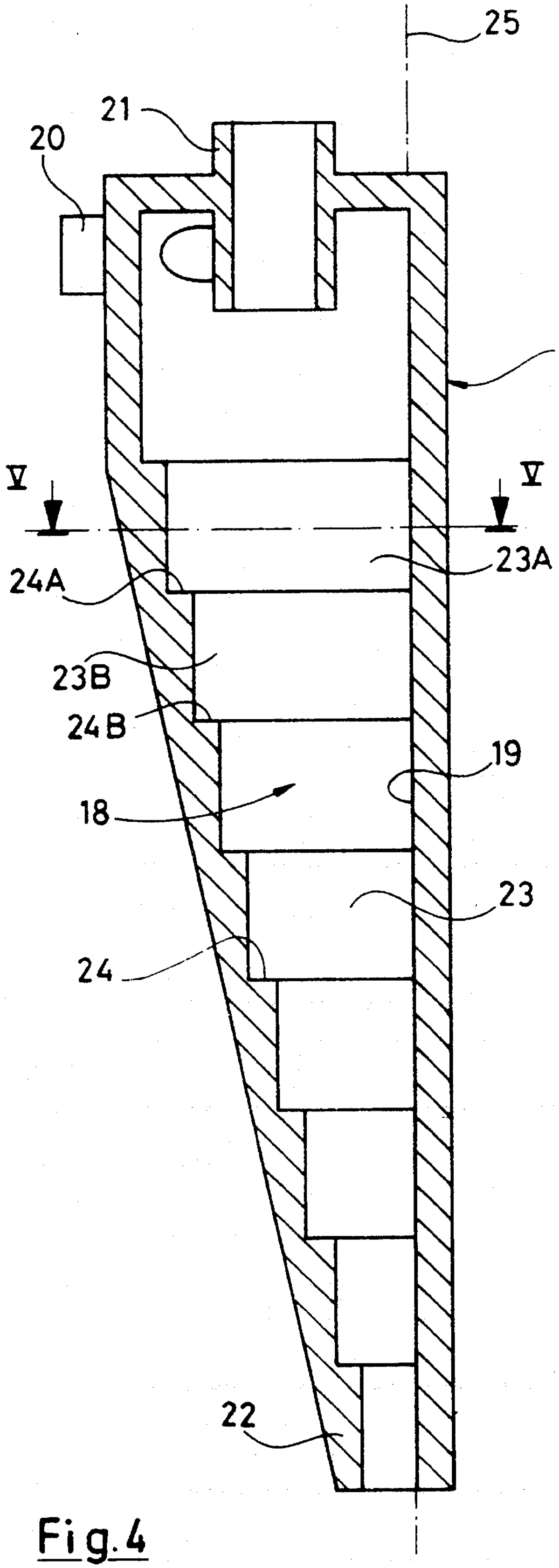
Figure 5:
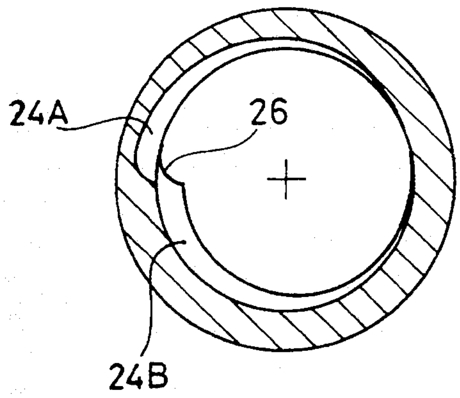

The invention is explained more closely in the following with reference to the accompanying drawing, in which FIG. 1 shows a hydrocyclone according to the invention, FIG. 2 shows a section along the line II—II in FIG. 1, FIG. 3 shows a cross-section through an alternative embodiment of the hydrocyclone according to FIG. 1, FIG. 4 shows a preferred embodiment of the hydrocyclone according to the invention, and FIG. 5 shows a part view of a section along the line V—V in FIG. 4.

The hydrocyclone shown in FIG. 1 comprises a housing 1, which forms an elongated separation chamber 2 with a circumferential wall 3 and two opposite ends. At one end the separation chamber 2 has an inlet part 4, which has a constant cross-sectional area along the axial extension of the separation chamber 2. The inlet part 4 of the separation chamber passes into a conical part 5, which has a decreasing cross-sectional area in direction towards the other end of the separation chamber.

An inlet member 6 is arranged at the inlet part 4 for feeding a liquid mixture to be separated tangentially into the separation chamber 2. At one end of the separation chamber 2 the housing 1 is formed with a tubular outlet member 7 situated centrally in the inlet part 4 for discharging separated light fraction from the separation chamber 2. At the other end of the separation chamber 2 the housing 1 is formed with an outlet member 8 for discharging separated heavy fraction from the separation chamber 2. A pump 9 is adapted to pump the liquid mixture to the separation chamber 2 via the inlet member 6, so that during operation a liquid stream is generated along a helical path 10 having a central axis 11 in the separation chamber 2 from the inlet member 6 to the outlet member 8 for heavy fraction.

The circumferential wall 3 has a smooth surface in a first zone A, which is at a substantially constant distance from the central axis 11 along half the circumference of the separation chamber 2. An offset 12 on the circumferential wall 3 extends axially along the entire separation chamber 2 with a constant transversal extension. (As seen in a cross-section through the separation chamber 2 the transverse extension of the offset 12 should not be less than 1% or more than 40% of the distance between the circumferential wall 3 and the central axis 11). Along the circumference of the separation chamber 2 the offset 12 extends from the zone I at the end of the latter, as seen in the flow direction of said liquid stream, to a second zone B of the circumferential wall 3 situated at a greater distance from the centre axis 11 than the first zone A.

The second zone B has a smooth surface and extends forwards in the flow direction from the offset 12 to the first zone A, the distance between the second zone B and the central axis 11 decreasing successively along the circumference of the separation chamber 2 in direction from the offset 12. At the end of the second zone B, as seen in the flow direction, the zone B has the same distance to the centre axis as the first zone A.

The circumferential wall 3 has a sharp edge 13 where the first zone A borders on the offset 12. As seen in a cross-section through the separation chamber 2 the set-off 12 is curved from the edge 13 forwards relative to the flow direction of the liquid stream and outwards relative to the separation chamber 2 to the second zone B of the circumferential wall 3. The offset 12 is connected to the second zone B of the circumferential wall 3 such that no edge is formed on the circumferential wall 3.

During operation of the hydrocyclone according to FIGS. 1 and 2 the liquid mixture to be separated is pumped by means of the pump 9 tangentially into the separation chamber 2 via the inlet member 6, so that a liquid stream is generated along the helical path 10 about the central axis 11. As the liquid stream passes the offset 12 it looses its contact with the circumferential wall 3, whereby a local underpressure is created behind the offset 12 as seen in the flow direction. Said underpressure gives rise to turbulence in a layer of the liquid stream located closest to the circumferential wall, which prevents growth of deposits on the circumferential wall 3. Created heavy fraction of the liquid mixture is emptied from the separation chamber 2 via the outlet member 8, while created light fraction of the liquid mixture is emptied from the separation chamber via the outlet member 7.

In FIG. 3 there is shown an alternative embodiment of the hydrocyclone according to the invention, in which the circumferential wall of the separation chamber is provided with two opposed offsets 12 and 15. In this case the circumferential wall has a smooth surface along a zone C immediately upstream each offset, which zone C is situated at a substantially constant distance from a central axis 16 in the separation chamber along a fourth part of the circumference of the separation chamber.

The hydrocyclone shown in FIGS. 4 and 5 comprises a housing 17, a separation chamber 18, a circumferential wall 19, an inlet member 20, an outlet member 21 for light fraction, and an outlet member 22 for heavy fraction, which have the same function as corresponding components in the above-described hydrocyclone according to FIG. 1. The separation chamber 18 is formed by a plurality, axially consecutively arranged cylindrical chamber portions 23 having various cross-sectional areas, the cross-sectional area of the separation chamber 18 being decreased step by step towards the outlet member 22. Between adjacent chamber portions 23 there are formed shelves 24 extending in the circumferential direction of the separation chamber 18. The chamber portions 23 are oriented such that their walls coincide to form a straight line 25 extending from the top to the bottom of the hydrocyclone. The line of coincidence, 25, provides a break in the shells 24. In contrast to a conical circumferential wall the circumferential wall in the cylindrical chamber portion 23 will not give rise to forces on separated heavy particles directed away from the outlet member 22 for heavy fraction.

An offset 26 on the circumferential wall 19 extends axially along the entire separation chamber 18 with a constant transverse extension and is situated in front of the straight line 25 which touches the chamber portions 23. Each chamber portion 23 has a cross-sectional area which in principle corresponds with the cross-sectional area of the separation chamber 2 shown in FIG. 2. The chamber portions 23 are designed such that the one of two adjacent chamber portions *23a* and *23b* which is next to the outlet member 22 has a transverse extension from the straight line 25 to the offset, which is equal to the corresponding transverse extension of the other chamber portion *23a* reduced by the transverse extension of the offset 26. As a result breaks are also formed in the shelves 24 at the offset 26. In FIG. 4 two adjacent shelves are designated with *24a* and *24b*, respectively, which also are shown in FIG. 5.

During operation of the hydrocyclone according to FIGS. 4 and 5 separated heavy particles will be entrained to the shelves 24 and leave these via said breaks at the straight line 25, which touches the chamber portions 23, and via said breaks at the setoff 26. In other respects the function of the hydrocyclone according to FIG. 4 is analogous to the above-described hydrocyclone according to FIG. 1.

I claim:

1. A hydrocyclone for separating a liquid mixture into a heavy fraction and a light fraction, comprising a housing forming an elongated separation chamber with a circumferential wall and two opposed ends, an inlet member for supplying a liquid mixture tangentially into the separation chamber at one end of the separation chamber, a first outlet member for discharging separated heavy fraction from the separation chamber at the other end of the separation chamber, a second outlet member for discharging separated light fraction from the separation chamber, means for supplying the liquid mixture to the separation chamber via the inlet member, so that during operation a liquid stream is generated along a helical flow path having a central axis in the separation chamber, said helical path extending from the inlet member to said first outlet member for heavy fraction, and at least one turbulence creating member, which extends in the separation chamber along the circumferential wall and crosses said helical path, wherein immediately upstream of the turbulence creating member in said flow path in the separation chamber the circumferential wall has a smooth surface extending along a first zone of the circumferential wall which is situated at a substantially constant distance from said central axis for at least a fifth of the circumference of the separation chamber, wherein the turbulence creating member is formed by an offset on the circumferential wall which offset extends from said first zone of the circumferential wall to a second zone of the circumferential wall situated at a greater distance from the central axis of the helical flow path than the first zone, the second zone extending forward from the offset in the flow direction of said helical flow path, the offset being formed and dimensioned so that during operation said liquid stream substantially loses its contact with the circumferential wall, as the liquid stream passes the offset, whereby turbulence is created in a layer of the liquid stream situated closest to the circumferential wall, without the liquid stream forming any substantial flow component directed toward said central axis.

2. A hydrocyclone according to claim 1, wherein said second zone extends for at least one fifth of the circumference of the separation chamber, the distance between the second zone and the central axis of the helical flow path decreasing along the circumference of the separation chamber in direction away from the offset in the flow direction of said helical flow path.

3. A hydrocyclone according to claim 1, wherein at the end of said second zone, in the flow direction of said helical flow path, the second zone is at substantially the same distance from the central axis as said first zone.

4. A hydrocyclone according to claim 1, wherein the circumferential wall has a sharp edge where said first zone of the circumferential wall borders the offset.

5. A hydrocyclone according to claim 1, wherein in a cross-section through the separation chamber the offset has a transverse dimension of between 1 to 40% of the distance between the circumferential wall and the central axis of the helical flow path.

6. A hydrocyclone according to claim 1, wherein the off-set extends transversely a constant distance axially along the separation chamber.

7. A hydrocyclone according to claim 6, in which the separation chamber is formed by a plurality of adjoining axially arranged cylindrical chamber portions, which are formed such that the cross-sectional area of the separation chamber decreases step by step towards said outlet member for heavy fraction, the chamber portions being aligned to define a straight line extending in parallel with the chamber portions, in each chamber portion said off-set being situated in front of said straight line.

8. A hydrocyclone according to claim 7, wherein of two adjacent chamber portions the chamber portion nearest to said outlet member for heavy fraction has a transverse extension from said straight line to the offset which amounts to the corresponding transverse extension of the second chamber portion reduced by at most the transverse extension of the offset.

* * * * *

UNITED STATES PATENT AND TRADEMARK OFFICE
CERTIFICATEOF CORRECTION

PATENT NO. : 5,437,794

DATED : August 1, 1995

INVENTOR(S) : Roine Andersson

It is certified that error appears in the above-identified patent and that said Letters Patent is hereby corrected as shown below:

Col. 3, line 9, cancel "offset" and substitute --offsets--.

Col. 6, line 5, cancel "setoff" and substitute --offset--.

Signed and Sealed this

Second Day of July, 1996

Attest:

BRUCE LEHMAN

*Attesting Officer*

*Commissioner of Patents and Trademarks*